United States Patent
Deschenaux

(10) Patent No.: US 12,548,078 B2
(45) Date of Patent: Feb. 10, 2026

(54) SYSTEM AND METHOD FOR TRANSACTIONS RELATING TO INTELLECTUAL PROPERTY SECURITIES

(71) Applicant: Marc R. Deschenaux, Geneva (CH)

(72) Inventor: Marc R. Deschenaux, Geneva (CH)

( * ) Notice: Subject to any disclaimer, the term of this patent is extended or adjusted under 35 U.S.C. 154(b) by 0 days.

(21) Appl. No.: 17/872,684

(22) Filed: Jul. 25, 2022

(65) Prior Publication Data

US 2023/0024737 A1    Jan. 26, 2023

Related U.S. Application Data

(60) Provisional application No. 63/225,910, filed on Jul. 26, 2021.

(51) Int. Cl.
*G06Q 40/06* (2012.01)
*G06Q 50/18* (2012.01)

(52) U.S. Cl.
CPC ........... *G06Q 40/06* (2013.01); *G06Q 50/184* (2013.01)

(58) Field of Classification Search
None
See application file for complete search history.

(56) References Cited

U.S. PATENT DOCUMENTS

| | | | | |
|---|---|---|---|---|
| 10,438,290 | B1 * | 10/2019 | Winklevoss | G06F 16/1815 |
| 11,334,883 | B1 * | 5/2022 | Auerbach | G06Q 20/223 |
| 11,580,448 | B2 * | 2/2023 | Cella | G06Q 30/0205 |
| 2011/0295757 | A1 | 12/2011 | Malackowski et al. | |
| 2012/0016809 | A1 * | 1/2012 | Frolov | G06Q 30/02 705/36 R |
| 2015/0310497 | A1 * | 10/2015 | Valin | H04L 51/08 705/14.66 |
| 2017/0244720 | A1 * | 8/2017 | Kurian | G06Q 40/00 |
| 2019/0130507 | A1 | 5/2019 | Stollman | |
| 2020/0005411 | A1 * | 1/2020 | Deschenaux | G06Q 50/184 |
| 2020/0143469 | A1 | 5/2020 | Stewart et al. | |
| 2020/0184431 | A1 * | 6/2020 | Sinmao | G06Q 20/389 |
| 2021/0271738 | A1 * | 9/2021 | Hatcher | G06F 21/16 |
| 2022/0051358 | A1 * | 2/2022 | Ma | H04L 9/3297 |
| 2023/0006976 | A1 * | 1/2023 | Jakobsson | H04L 63/10 |

OTHER PUBLICATIONS

International Search Report and Written Opinion in related International Application No. PCT/IB2023/000503, dated Dec. 7, 2023.
Anonymous: "Event Monitoring—Ethereum Smart Contract Best Practices", Apr. 26, 2022 (Apr. 26, 2022), XP093103207, URL:https://web.archive.org/web/20220426082716/https://consensys.github.io/smart-con tract-best-practices/development-recommend ations/solidity-specific/event-monitoring/.

* cited by examiner

*Primary Examiner* — Peter D Nolan
*Assistant Examiner* — Matthew Cobb
(74) *Attorney, Agent, or Firm* — Reed Smith LLP; Lisa A. Chiarini; Richard J. Brown

(57) ABSTRACT

A distributed networked computer system and methods for managing securitization of intellectual property assets wherein investors are paid from the revenue stream associated with the intellectual property as the revenues are received.

21 Claims, 10 Drawing Sheets

SYSTEM AND METHOD FOR TRANSACTIONS RELATING TO INTELLECTUAL PROPERTY SECURITIES

CROSS-REFERENCE

This application claims the benefit of U.S. Provisional Application Ser. No. 63/225,910 filed Jul. 26, 2021, the contents of each of which are incorporated herein in their entirety.

FIELD OF THE INVENTION

The present invention relates to the field of assets and financing and more specifically to the securitization of intellectual property rights. More specifically, systems and methods are disclosed which generally relate to executing transactions for intellectual property securities.

BACKGROUND

A security has been defined as any instrument to which a right to an asset attaches in such a manner that it may not be exercised or transferred to another without the instrument, typically for the purpose of raising capital by selling it to other investors. The process of securitization relies upon agreement (contract), indenture, or specific legal regulation, establishing, for instance, stocks and shares. A pass-through security has its origins in mortgage-backed securities. A pass-through security is backed by one or more income generating assets. A servicing intermediary collects the monthly payments from the issuer(s) and, after deducting a fee, remits or passes them through to the holders of the pass-through security (that is, the investors).

A pass-through security is also known as a "pay-through security" or a "pass-through certificate"—though technically the certificate is the evidence of interest or participation in the income generating asset(s) that signifies the transfer of payments to investors; it is not the security itself.

A pass-through security is a derivative based on certain royalties or debt receivables that provides the investor a right to a portion of those incomes. Often, the royalties or debt receivables are from underlying asset(s), which can include things such as movies or music royalty streams, mortgages on homes or loans on vehicles. Each security can represents a large number of revenue streams, such as hundreds of royalty streams, home mortgages or thousands of car loans.

Intellectual property rights are a legal mechanism to incentivize creation of intangible products. According to specific criteria, the creator is entitled to ownership of the intellectual property asset. Intellectual property rights consist of an intangible right, which is not held in the physical object. For example, a copyright gives the creator of an original work protection over their intellectual property asset, such as a movie script, play script, novel, short story, and the like. A patent protects a technical invention, which is novel and has a concrete use and a trademark is a symbol used in a business context, which is protected by an intellectual property right. Often, a single entity, such as a company (e.g., corporation, limited liability company) owns intellectual property rights in various different intellectual property assets segregated, for example, across the business lines of the entity. For example, Walt Disney Company ("Disney"), together with its subsidiaries, is a diversified worldwide entertainment company with operations in four business segments: Media Networks, Studio Entertainment, Direct-to-Consumer and International, and Parks, Experiences and Consumer Products. Disney may hold different intellectual property rights for different intellectual property assets in each business segment. However, when investors invest in Disney by purchasing stock, they are purchasing a security that represents the ownership of a fraction of Disney as a whole; not a security that is targeted to a particular business segment of Disney or to a particular intellectual property right or asset owned by Disney.

Traditionally, investors have been able to invest capital in a collective venture such as Disney or other corporations by buying shares of equity in the entire company, but not in a particular business segment. For example, someone interested in investing in the movie industry is only able to buy equities in the corporation that produces movies. However, such corporation may be large and diversified and have ventures or business segments outside of movie production that may not be of interest to individual investors or may cause the valuation of the company to be limited. In some instances, an investor may wish to invest in a more targeted manner, such as by only investing in certain business segments of the diversified corporation or alternatively in specific targeted intellectual property assets, such as one or more movies or copyrights pertaining thereto.

It may be desirable to offer intellectual property securities that allow investment in specific portions of a large company's total structure, such as investing in specific projects or works such as one movie, one patent, one song, one book, or one design, or bundles of related works. Such creative works are recognized under the umbrella term of intellectual property as activities that inherently carry property rights that can be valued and protected under any intellectual property laws such as copyright, patent and trademark laws. Up until to now, securitizing intellectual property only meant using it as collateral for loans or bonds. For example, Bowie bonds, also known as Pullman bonds, were asset securities which used the current and future revenue from albums recorded by musician David Bowie as collateral. Although collateralized by intellectual property, the bonds were structured as typical bonds with a fixed interest rate and payment schedule. It is desirable to offer other ways for investing in specific intellectual property.

SUMMARY

From the foregoing discussion, it should be apparent that a need exists for a system and method that enable creators and innovators to finance their work, i.e., intellectual property assets. Beneficially, such a system and method would establish a reliable marketplace for intellectual property assets, increase incentive for innovation, optimize patterns of productivity and discourage rent seeking. The innovation presented herein allows for the securitization of intellectual property.

Provided is a security for monetizing or securitizing one or a plurality of intellectual property assets, such as patents, motion pictures, works of authorship, songs and designs, wherein the security comprises a pass-through security that pays a portion of a revenue stream, such as a royalty or licensing fee, to the holder of the security as the revenue is received by the issuer of the security.

Provided is an intellectual property-backed security (IPBS) comprising investment shares backed by one or a plurality of intellectual property assets providing a defined payout to investors based on the revenue stream associated with the intellectual property asset or assets and systems and methods for managing the IPBS.

A first aspect provides a distributed networked computer system for managing securitization of intellectual property assets, the distributed network computer system comprising: a non-transitory computer readable storage medium having program instructions embodied therewith; and one or more processors configured to execute the program instructions to cause the computing system to receive, from a first networked node, a first bid for one or more shares of an intellectual property backed security ("IPBS") from a first investor; determine, by a central processor, a fractional share of the IPBS to allocate to the first investor based on the first bid; allocate, by one or more processors, the fractional share of the IPBS to the first user; a distributed ledger for recording bids for the IPBS and respective allocated shares determined by the central processor, wherein the distributed ledger is accessible by the first networked node; and a smart contract accessible to the first networked node, wherein the smart contract comprises a revenue stream payout triggering event; and a plurality of predetermined electronic actions for generating a smart contract output when the revenue stream payout triggering event is met, wherein the smart contract generates a revenue stream payout to the first investor automatically when the payout event is triggered, and further wherein the execution of the smart contract is recorded to the distributed ledger.

Embodiments of the system include the following, alone or in any combination.

The smart contract is between the first investor and an issuer of the intellectual property backed security.

The payout triggering event is based on revenue associated with monetization of the intellectual property asset.

The intellectual property asset is a movie production, and further wherein the monetization comprises distribution of the movie.

The intellectual property asset is a work of authorship, and further wherein the monetization comprises sale of production rights or publishing rights to the work of authorship.

The system further comprising one or more processors configured to execute the program instructions to cause the computing system to receive, from a plurality of networked nodes, a plurality of bids for one or more shares of an intellectual property backed security ("IPBS") from a plurality of investors, determine, by the central processor, a fractional share of the IPBS to allocate to each of the plurality of investors based on the respective bids associated with each investor; and allocate, by one or more processors, the fractional shares of the IPBS to each of the plurality of investors. In the system, a plurality of smart contracts are accessible to the plurality of networked nodes, wherein each of the plurality of smart contracts comprises a revenue stream payout triggering event; and a plurality of predetermined electronic actions for generating a smart contract output when the revenue stream payout triggering event is met, wherein the smart contract generates a revenue stream payout to at least some of the plurality of investors automatically when the revenue stream payout event is triggered and further wherein each execution of each of the smart contracts is recorded to the distributed ledger.

The payout is a portion of a royalty associated with the intellectual property asset.

The payout triggering event comprises a first threshold that occurs when monetization of the intellectual property asset exceeds total expenses associated with producing the intellectual property asset. In some instances, only some of the smart contracts are executed to distribute a payout when the first threshold triggering event is met, based on the terms of each smart contract.

A second aspect provides a non-transitory computer readable storage medium comprising a plurality of computer readable instructions embodied thereon wherein the instructions, when executed by a distributed networked computer system for managing securitization of intellectual property assets, cause the distributed networked computer system to receive, from a first networked node, a first bid for one or more shares of an intellectual property backed security ("IPBS") from a first investor; determine, by a central processor, a fractional share of the IPBS to allocate to the first investor based on the first bid; allocate, by one or more processors, the fractional share of the IPBS to the first user; record in a distributed ledger accessible by the first networked node, bids for the IPBS; respective allocated shares determined by the central processor; and execution of a smart contract accessible to the first networked node, wherein the smart contract comprises a revenue stream payout triggering event; and a plurality of predetermined electronic actions for generating a smart contract output when the revenue stream payout triggering event is met, wherein the smart contract generates a revenue stream payout to the first investor by automatically when the payout event is triggered.

Embodiments of the non-transitory computer readable storage medium include the following, alone or in any combination.

The smart contract is between the first investor and an issuer of the intellectual property backed security.

The payout triggering event is based on revenue associated with monetization of the intellectual property asset.

The intellectual property asset is a movie production, and further wherein the monetization comprises distribution of the movie.

The intellectual property asset is a work of authorship, and further wherein the monetization comprises sale of production rights or publishing rights to the work of authorship.

The instructions further cause the distributed networked computer system to receive, from a plurality of networked nodes, a plurality of bids for one or more shares of an intellectual property backed security ("IPBS") from a plurality of investors, determine, by the central processor, a fractional share of the IPBS to allocate to each of the plurality of investors based on the respective bids associated with each investor; and allocate, by one or more processors, the fractional shares of the IPBS to each of the plurality of investors. The instructions may further cause the distributed networked computer system to record to the distributed ledger a plurality of smart contracts accessible to the plurality of networked nodes, wherein each of the plurality of smart contracts comprises a revenue stream payout triggering event; and a plurality of predetermined electronic actions for generating a smart contract output when the revenue stream payout triggering event is met, wherein the smart contract generates a revenue stream payout to at least some of the plurality of investors automatically when the revenue stream payout event is triggered and further wherein each execution of each of the smart contracts is recorded to the distributed ledger.

The payout is a portion of a royalty associated with the intellectual property asset.

The payout triggering event comprises a first threshold that occurs when monetization of the intellectual property asset exceeds total expenses associated with producing the intellectual property asset. In some instances, only some of the smart contracts are executed to distribute a payout when the first threshold triggering event is met, based on the terms of each smart contract.

A third aspect is a method for managing securitization of intellectual property assets by a distributed networked computer system, the method comprising receiving, from a first networked node, a first bid for one or more shares of an intellectual property backed security ("IPBS") from a first investor; determining, by a central processor, a fractional share of the IPBS to allocate to the first investor based on the first bid; allocating, by one or more processors, the fractional share of the IPBS to the first user; recording in a distributed ledger, wherein the distributed ledger is accessible by the first networked node, bids for the IPBS; respective allocated shares determined by the central processor; and execution of a smart contract accessible to the first networked node, wherein the smart contract comprises a revenue stream payout triggering event; and a plurality of predetermined electronic actions for generating a smart contract output when the revenue stream payout triggering event is met, wherein the smart contract generates a revenue stream payout to the first investor by automatically when the payout event is triggered.

Embodiments of the non-transitory computer readable storage medium include the following, alone or in any combination.

The smart contract is between the first investor and an issuer of the intellectual property backed security.

The payout triggering event is based on revenue associated with monetization of the intellectual property asset.

The intellectual property asset is a movie production, and further wherein the monetization comprises distribution of the movie.

The intellectual property asset is a work of authorship, and further wherein the monetization comprises sale of production rights or publishing rights to the work of authorship.

The method further comprising receiving, from a plurality of networked nodes, a plurality of bids for one or more shares of an intellectual property backed security ("IPBS") from a plurality of investors; determining, by the central processor, a fractional share of the IPBS to allocate to each of the plurality of investors based on the respective bids associated with each investor; and allocating, by one or more processors, the fractional shares of the IPBS to each of the plurality of investors. The method may further comprise recording to the distributed ledger a plurality of smart contracts accessible to the plurality of networked nodes, wherein each of the plurality of smart contracts comprises a revenue stream payout triggering event; and a plurality of predetermined electronic actions for generating a smart contract output when the revenue stream payout triggering event is met, wherein the smart contract generates a revenue stream payout to at least some of the plurality of investors automatically when the revenue stream payout event is triggered and further wherein each execution of each of the smart contracts is recorded to the distributed ledger.

The payout is a portion of a royalty associated with the intellectual property asset.

The payout triggering event comprises a first threshold that occurs when the monetization of the intellectual property asset exceeds total expenses associated with producing the intellectual property asset. In some instances, only some of the smart contracts are executed to distribute a payout when the first threshold triggering event is met, based on the terms of each smart contract.

Embodiments of the intellectual property security include those wherein the intellectual property assets are selected from patents, trademarks, and copyrighted works, such as movies, printed works, software, songs and designs, preferably movies.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
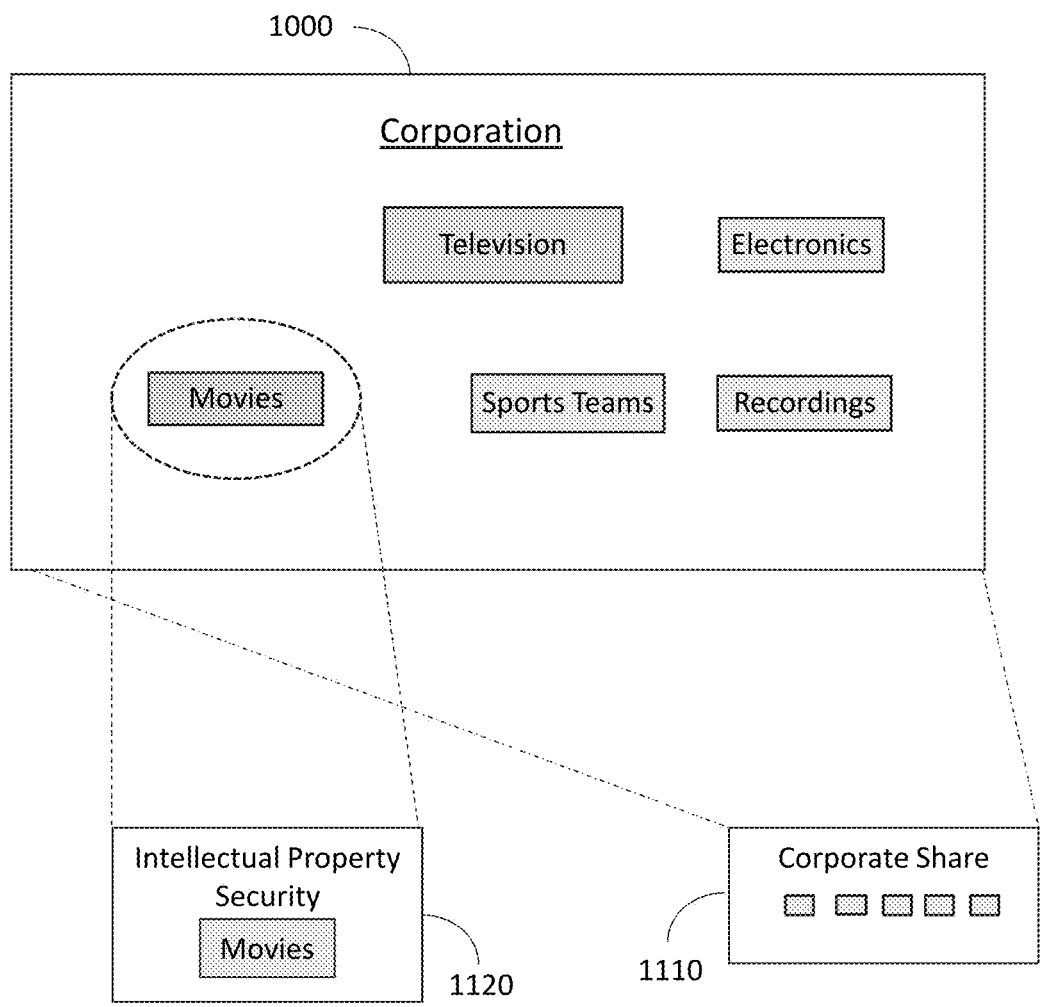
FIG. 1 depicts a schematic chart of securities according to an exemplary embodiment of the disclosed subject matter.

In accordance with various embodiments of the invention, and as shown in the figures, various systems and methods are disclosed which generally provide a platform for the creation, communication, price quotation, and execution of trades for specified pools of intellectual property asset securities.

This disclosure provides systems and methods for securitization of intellectual property. Briefly, a creator or holder of an intellectual property asset may wish to monetize the intellectual property asset to raise capital from investors against future earnings or revenue derived from the asset. In some instances the asset may a "future" asset in the sense that the intellectual property may not be fully realized. For example, a movie production company may raise capital for production of an upcoming movie based on the track record of similar movies. The asset may be a single intellectual property or a plurality of intellectual property assets may be pooled together.

The intellectual property asset may be securitized by assigning it to an issuer of intellectual property-backed securities. The issuer determines a valuation for the assigned intellectual property and defines an offering of intellectual property-backed securities derived from the asset for sale to one or more investors. The offering defines a plurality of fractional shares of the IPBS that provide a future payout to the investors based on revenue derived from the asset. The issuer retains management of the intellectual property, either directly or reverting it back to the creator. Investors purchase fractional shares of the IPBS based on promise of future earnings. The IPBS is administered in a distributed networked computer system using smart contracts among the issuer, the creator and the investors. The system automatically pays out to investors in response to revenue stream triggering events based on the terms of the smart contracts. In embodiments, the issuer and/or creator may hold a fraction of the IPBS to also receive future income from the revenue generated by the asset.

The term Intellectual Property-Backed Security relates to the transaction process of securitizing intellectual property. It involves one or more intellectual property assets. It originates with the licensee's payments, which pass through a collecting society before being released to the investor.

Monetization is the action or process of earning revenue from an asset, business, and includes for example, sale or rental of copies, licensing fees and royalty fees. A royalty is a legally binding payment made to an individual or company for the ongoing use of their assets, including copyrighted works, franchises, and natural resources. Royalties are usage-based payments for using an asset or property, generally determined as a percentage of gross revenue or net profit. A licensing fee is money paid for using the property, but this fee is generally a specified amount. In either case, the payments may be modified based on their association to one or more thresholds related to the level of usage.

As used herein, the term "motion picture" includes a creative work that comprises a set moving images and includes movies, television productions, video games, and the like. The motion picture may be recorded using film, video and digital formats. Each may have further ancillary rights based on the content, such as merchandise or games based on characters or design elements of the motion picture. Video games may further comprise copyrighted software for operating the game. Distribution is the process of providing a motion picture for viewership and can be carried out by supplying copies to theaters, broadcasting, simulcasting, pay-per-view, streaming, providing online content to any type of site or device, etc.

A "work of authorship" includes a creative work that combines words to convey a narrative and includes scripts for movies and plays, novels, short stories, poems and the like. The IPBS may be based on revenue from sale of copies and/or production rights to produce merchandise and/or additional intellectual property derived from the work of authorship, such as movies, television productions or video games A "song" is a creative work comprising a collection of musical tones and optionally lyrics. A song may be written using musical notation capable of being performed by one or more artists. The term also includes a performance of a song by an artist that is recorded for replay. As used herein, a collection of individual songs such as an album or soundtrack is also included.

An Intellectual Property Security may comprise a revenue stream derived from monetization of an intellectual property asset such as a movie, a patent, a song, a book, a design or any other registered intellectual property. A servicing intermediary may collect revenue payments from the issuer and, after deducting a small management fee, remits or passes a portion of the revenue through to the holders of the intellectual property pass-through security.

Each security can represent from one single intellectual property asset to a large number of intellectual property assets in any combination.

When there is a number of intellectual property assets, these can be of different kinds like the portfolio of rights combined in a movie, including image rights, music rights etc.

Payments may be made to investors periodically or following a triggering event, corresponding with the payment schedules set in the movie licensing or distribution agreements.

The intellectual property securities systems and methods described herein allow for investment in one or more intellectual properties owned by an entity, such as a company or an individual creator of intellectual property, wherein individual investors are able to invest in specific intellectual property owned by a company instead of buying fractional shares in the company.

As illustrated in FIG. 1, a company, such as an entertainment-focused corporation 1000, may hold a number of ventures, including movies, television (including production and distribution venues such as networks or streaming services), sports teams, electronics and recordings. An investor may purchase fractional shares 1110 in the corporation in which the investor receives dividends based on the financial performance of all ventures held by the corporation. Because these ventures may perform with different revenues, profits, expenses, etc. the shares 1110 represent a portion of profits weight-averaged across the entire corporation. In an alternative, an investor could invent in a targeted segment of the corporation by buying intellectual property securities 1120. In the embodiment shown, the intellectual property securities 1120 are based on one or a plurality of movie assets held by the corporation 1000.

Figure 2A:
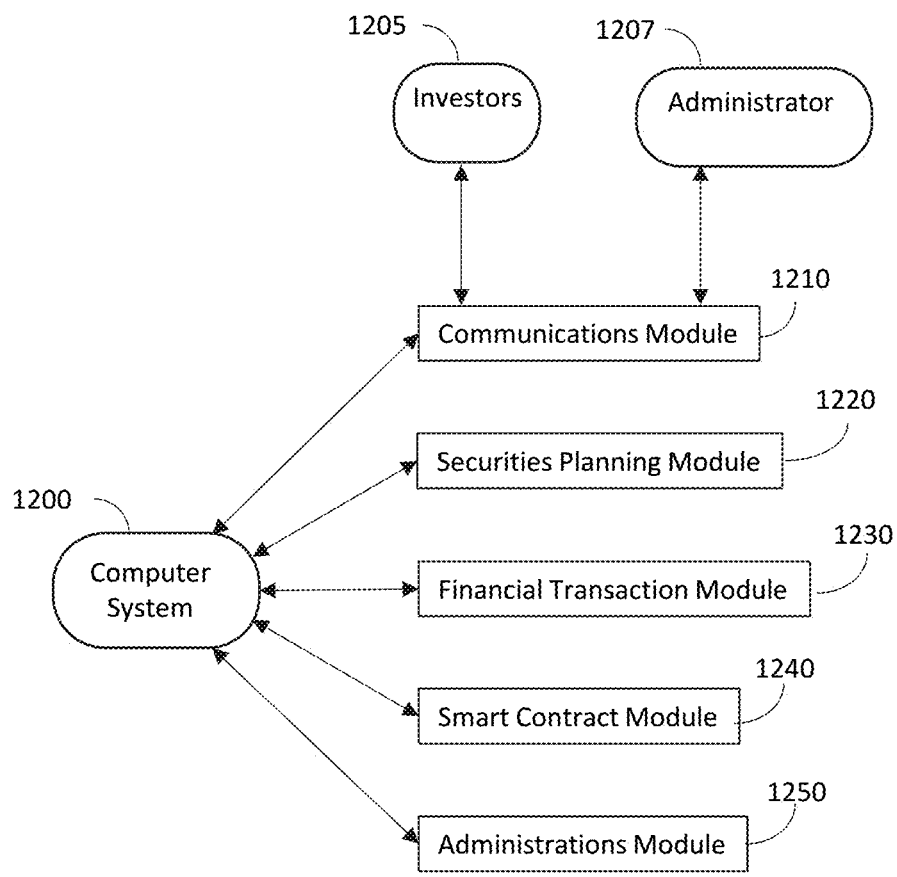
FIGS. 2A-2B depict a schematic functional diagram of a computer system relating to planning and developing securities, modeling and evaluating alternatives, as well as executing and administering an offering for sale of securities according to an exemplary embodiment of the disclosed subject matter.

As shown in FIG. 2A, a computer system 1200 is a core element of the intellectual property securities architecture, receiving, generating, storing, integrating and coordinating data required for defining intellectual property receiving investment payments from a plurality of investors 1205, matching bids from the plurality of investors, optionally generating smart contracts among investors and the company or issuer, determining revenues related to the intellectual properties and administering payouts to investors. The computer system is further provided with at least one processor and into which is loaded software components for receiving informational inputs from the plurality of investors via communications module or interface 1210.

Block 1210 represents a communication module, which manages inputs from investors and transmits outputs to the investors. Inputs from investors include investing information, investor identity, designation of a payment vehicle or digital "wallet", such as a credit or debit account, including credit or debit cards issued by a financial institution, Venmo® or Pay Pal® apps, etc. Communications module 1210 may also be used by administrator(s) 1207 of the computer system to communicate with the system. Administrator(s) may provide inputs to the system to maintain and manage the system to make sure it is operating correctly. In embodiments, the administrator(s) 1207 may also provide inputs to the system to designate intellectual property assets for investors to invest in, risks assessments, projected revenue streams, etc.

Figure 2B:
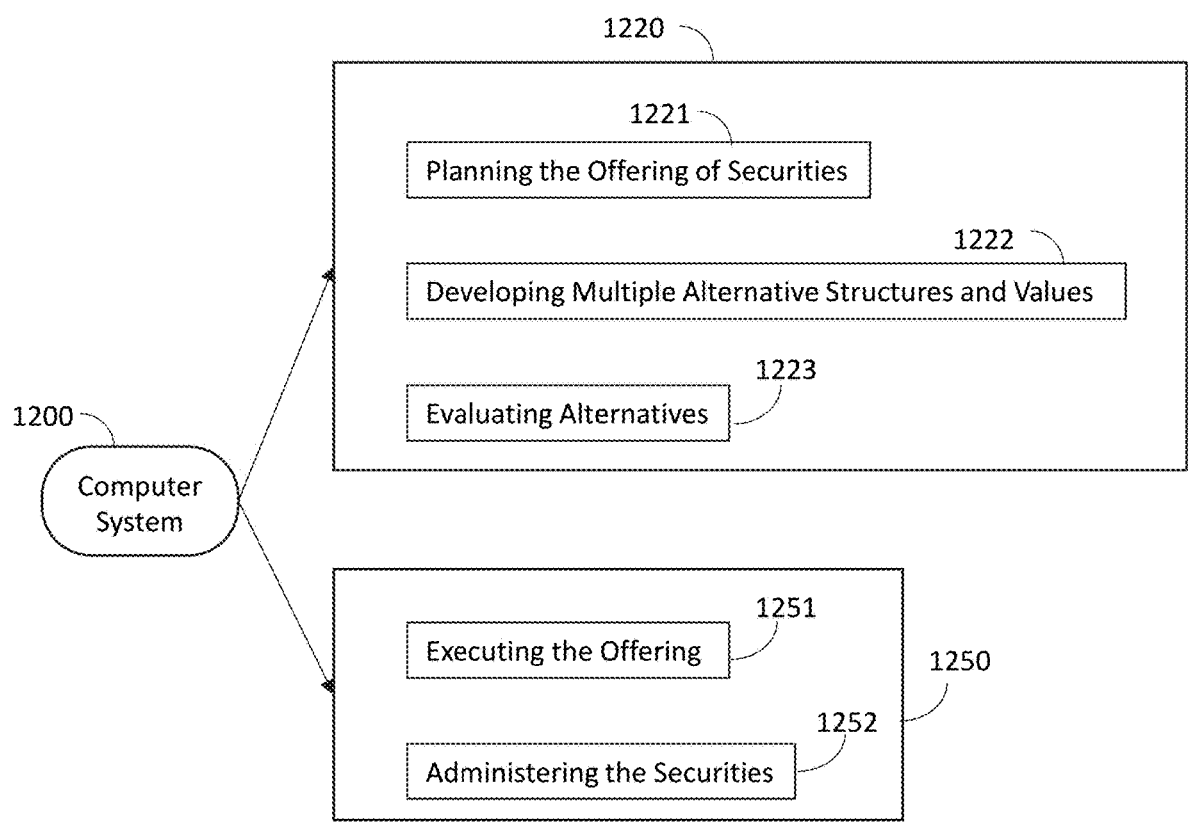

In block 1220, the system includes a securities planning module in which the intellectual property securities are defined, as described in greater detail in regard to FIG. 2B.

Block 1230 comprises the financial transactions module that manages payments from investors to cover their bids, payments to investors and collection of transaction fees. In embodiments, once a bid is accepted, the financial transactions module may withdraw the bid amounts plus transaction fees from investors' payment vehicles in response to acceptance of bids by the computer system. Block 1230 also receives payments from the revenue streams associated with the intellectual property assets backing the intellectual property securities and disburses payments to the investors based on the terms of the intellectual property securities.

In embodiments, the intellectual property securities may be offered in the form of a smart contract, described in greater detail below. In block 1240, the smart contract module executes smart contracts by generating data blocks defining the intellectual property securities, including all terms and conditions binding on the investors and the company such as purchase prices, revenue streams from the intellectual properties, percentages of the revenue streams represented by the securities, etc.

Block 1250 shows the securities administration module, which executes and administers the intellectual property securities.

As shown in FIG. 2B, block 1220 comprises aspects of defining the intellectual property security offerings.

In block 1221, planning the offering of securities includes establishing the target amount of capital to be raised. Guided by inputs from administrator(s) of the system representing the seller, bank, broker, underwriter and/or other financial institutions, the system conducts feasibility studies for offering intellectual properties to define the structure of the offering. The offering planning includes specific variables to be included, ranges of acceptable values for each variable, and terms and conditions to be included in the offering.

In block 1222, the system models and projects multiple values of individual variables and combinations of multiple sets of variables, such as time series projections and economic modeling of interaction among variables.

In block 1223, the system evaluates alternatives by reviewing results of modeling and projections. Selecting one or more sets of variables that meet targets will be used to refine the structure and value of variables and terms and conditions for price categories of the intellectual property shares. Additional modeling and projections may be required to define a preferred set of values for the variables and terms and conditions for inclusion in the offering of securities in the price categories of the intellectual property shares. When initiated by the seller, one or more intellectual property securities may be offered as individual or pooled assets. When initiated by a buyer, the buyer may input a desired type of security and the system may generate securities based on the defined characteristics.

FIG. 2B also shows block 1250 comprising aspects of administering the intellectual property security offerings.

In block 1251, the system executes the offering of the securities. The price and content of the individual shares of the price category tranches are established, including definitions of shares of revenues and assets to be included in each offering. Technical and legal details are finalized and the intellectual property securities are brought to market. The system receives and accepts bids for shares in each intellectual property security from at least one investor, tracks progress of sales of shares within each intellectual property security, and closes sales when target values are met. The system may also receive sell orders from holders of shares and sell them to new investors.

Block 1251 may comprise an order creation module. In general, the order creation module may have two modes of functionality. In a first mode, the order creation module permits a buyer to search a database of specified pools and to select one or more pools from the inventory for pricing by a selected group of sellers. It will be understood from the following disclosure that, although multiple pools are selected, any number of pools less than the total number selected (or none at all) may be quoted and ultimately traded. In a second mode, a buyer is provided with the option to select the characteristics of a desired specified pool. These characteristics may be transmitted through system 1200 to one or more sellers. The sellers can identify one or more pools in their respective inventories that substantially meet the buyer's specified set of characteristics or agree to create a specified pool meeting such characteristics.

Figure 3:
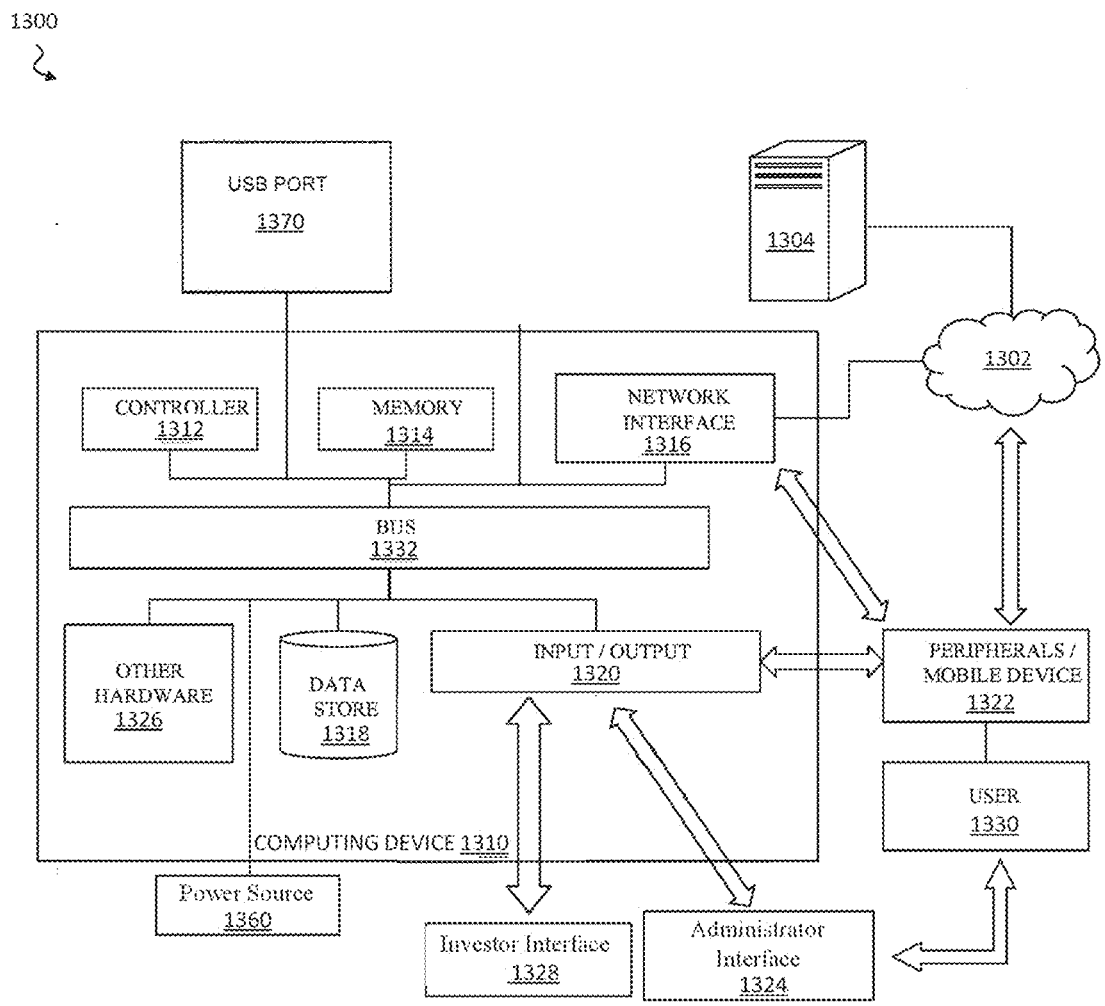
FIG. 3 depicts a functional diagram of components of a computer system according to an exemplary embodiment of the disclosed subject matter.

In operation, by setting various criteria and through selection of one or more sellers, through the operation of the order creation module, buyers can create a customized inventory query which will return available asset securities from database(s) in the system (See FIG. 3). In the alternative, the query can be submitted directly to the seller in order to determine whether the seller has or can stipulate to an asset security meeting the buyer's requirements. This feature may be used when a security meeting the buyer's requirements is not in the inventory of one or more sellers.

In an alternative embodiment, wherein one or more desired securities are not in an inventory of offered properties, a buyer may be enabled to send an inquiry message to one or more sellers inquiring as to the availability of a security meeting the buyer's needs. In this embodiment, a buyer typically creates an order query using system 1200's order creation module to determine whether the desired security is listed in the system's database of securities previously populated by one or more sellers. Such query details may include, title(s) or other identifier(s) of assets, a pool number of an asset pool, a weighted average maturity, a constant payment rate, an originator identifier, etc. While the buyer may use various inventory filters to enable the buyer to search for securities meeting defined criteria, in some instances, the desired security may not be available. In those instances, the buyer can define the criteria according to which an inquiry message will be generated and transmitted to one or more sellers. A dealer or agent list may include a list of dealers, acting as sellers, and aspects of the buyer interface enable the buyer to select the dealers to which the inquiry message will be transmitted. Once the buyer completes the process of inputting desired criteria and selecting dealers, the criteria and dealer data is transmitted to and received by system 1200. System 1200 then generates an inquiry message which includes the characteristics for the pool of assets defined by the buyer. The data in the inquiry message is then transmitted to the selected dealer(s)

In block 1252, the system administers the securities (shares) in the offering. It maintains detailed and current records of individual investor accounts as required for periodic and cumulative payments, tax treatment, benefits, reports and other purposes. It maintains required and useful records related to financial analysis and financial reports of investors, brokers, and other involved parties. In embodiments, the records may be recorded in a distributed ledger such as a blockchain.

In embodiments, the offering, sale and administration of the intellectual property securities may be conducted as a smart contract.

A smart contract is a computer application simulating the operation of a contract. It is a computer program or a transaction protocol which is intended to automatically execute, control or document legally relevant events and actions according to the terms of a contract or an agreement between or among parties. The objectives of smart contracts are the reduction of need in trusted intermediators, arbitrations and enforcement costs, fraud losses, as well as the reduction of malicious and accidental exceptions. The smart contract is stored on a distributed ledger such as a blockchain that runs when predetermined conditions are met. Distributed ledger technology (DLT) is a digital system for recording the transaction of assets in which the transactions and their details are recorded in multiple places at the same time. Unlike traditional databases, distributed ledgers have no central data store or administration functionality. They may be used to automate the execution of an agreement so that all participants can be immediately certain of the outcome, without any intermediary's involvement or time loss.

The reliability of the smart contract comes from its automaticity which gives it a power of execution unmatched to date.

A smart contract also can be regarded as a secured stored procedure as its execution and codified effects like the transfer of some value between parties are strictly enforced and cannot be manipulated, after a transaction with specific contract details is stored into a blockchain or distributed ledger. That is because the actual execution of contracts is controlled and audited by the platform, not by any arbitrary server-side programs connecting to the platform. Smart contracts are particularly useful for managing exchanges of virtual financial or value assets, where no tangible materials need to be moved.

Blockchain is a distributed ledger technology that enables a set of peers to work together to create a unified, decentralized network. The peers can communicate and share information or data with the help of a consensus algorithm. There is no need for a centralized authority, which makes the whole network trustworthy when compared to other networks. When one peer sends information to another, a transaction is generated in the form of a "block". Blocks are used to store transactions and other important information that is required to operate the blockchain successfully. When this happens, the transactions need to be validated using the consensus algorithm. Proof of Work is used to validate the work. It ensures that no invalid transactions are passed into the blockchain. Timestamps are created to ensure that each transaction can be traced, backed, and verified by anyone. The blockchain provides transparency, immutability, and security The contracting parties program the contractual terms, payments to be made and all dispatches of documents used for the execution of the contract in the software application and may no longer retract their commitments. Once launched, the application performs the scheduled operations without human intervention, as scheduled or triggered by a defined triggering event.

End clients interact with a smart contract through transactions. Such transactions with a smart contract can invoke other smart contracts. These transactions might result in changing the state and sending financial assets from one smart contract to another or from one account to another. Financial assets can include nationally denominated currencies, cryptocurrencies, virtual stock certificates, or other asset whose value can be defined digitally.

Similar to a transfer of value on a blockchain, deployment of a smart contract on a blockchain occurs by sending a transaction from a wallet for the blockchain. The transaction includes the compiled code for the smart contract as well as a special receiver address. That transaction must then be included in a block that is added to the blockchain, at which point the smart contract's code will execute to establish the initial state of the smart contract. Byzantine fault-tolerant algorithms secure the smart contract in a decentralized way from attempts to tamper with it. Once a smart contract is deployed, it cannot be updated. Smart contracts on a blockchain can store arbitrary state and execute arbitrary computations.

The reliability of the smart contract can be greatly increased by relying on a decentralized IT environment allowing secure access to the contractors and unfalsifiable by them.

Each smart contract may include information about the investment in the intellectual property-backed security. Such information may include the amount of the investment, the agreed upon payouts, triggering events, the revenue stream, the time the investment is agreed upon, the identities of the parties, etc. Investment information may further include conditional outcomes based upon each potential outcome, including the facilitation of payment from the seller to the investor, and/or the return of funds in event of a void or cancellation. In some embodiments, a settlement service may be agreed upon among the parties.

Some embodiments provide that the smart contracts may be generated on individual PC's, on a mobile device and/or in the cloud. Such examples are non-limiting as the smart contracts may be generated at a variety of other devices and/or types thereof. In some embodiments, each smart contract may involve external services at the discretion of the parties. In some embodiments, a range of options may be selected by the parties at the time the smart contract is generated.

Some embodiments provide that a smart contract may be registered with a settlement service provider that is agreed to by the parties. In some embodiments, a settlement service may provide information about the outcome, such as revenue generated, of the intellectual properties on which the security is based. In some embodiments, the settlement service may send the information to the counterparties, which may trigger the payouts under the terms of the smart contract. For example, the settlement service provider may initiate a bank transfer from the seller to the buyer based on the smart contract or from the payer of the revenue (e.g. licensing fee or royalty) directly to the investor. In some embodiments, the process may be automated by software on a computer and/or server controlled by the settlement service. Embodiments herein do not require the funds to be held in any kind of escrow, however, such option is contemplated by this disclosure. For example, embodiments herein are directed to any financial settlement process that may be used in conjunction with the smart contracts as disclosed herein.

Some embodiments provide that the settlement transaction may be stored in blockchain to close the contract. In some embodiments, details corresponding to the settlement transaction may be retained for auditing, later scrutiny and/or to ensure that no errors are made.

FIG. 3 depicts a computer system 1300 according to an embodiment of the present disclosure. In general, the computer system 1300 may include a computing device 1310, such as a special-purpose computer designed and implemented for receiving user inputs, determining and directing and controlling the output of signals. The computing device 1310 may be or include data sources, client devices, and so forth. In certain aspects, the computing device 1310 may be implemented using hardware or a combination of software and hardware. The computing device 1310 may be a stand-alone device, a device integrated into another entity or device, a platform distributed across multiple entities, or a virtualized device executing in a virtualization environment.

The computing device 1310 may communicate across a network 1302. The network 1302 may include any data network(s) or internetwork(s) suitable for communicating data and control information among participants in the computer system 1300. This may include public networks such as the Internet, private networks, and telecommunications networks such as the Public Switched Telephone Network or cellular networks using cellular technology and/or other technologies, as well as any of a variety other local area networks or enterprise networks, along with any switches, routers, hubs, gateways, and the like that might be used to carry data among participants in the computer system 1300. The network 1302 may also include a combination of data networks and need not be limited to a strictly public or private network.

The computing device 1310 may communicate with an external device 1304. The external device 304 may be any computer, mobile device such as a cell phone, tablet, smart watch or other remote resource that connects to the computing device 1310 through the network 1302. This may include any of the servers or data sources described herein, including servers, content providers, databases or other sources for shot information to be used by the devices as described herein.

In general, the computing device 1310 may include at least one controller or processor 1312, a memory 1314, a network interface 1316, a data store 1318, and one or more input/output interfaces 1320. The computing device 1310 may further include or be in communication with peripherals 1322 and other external input/output devices that might connect to the input/output interfaces 1320.

The controller 1312 may be implemented in software, hardware or a combination of software and hardware. According to one aspect, the controller 1312 may be implemented in application software running on a computer platform. Alternatively, the controller 1312 may include a processor or other processing circuitry capable of processing instructions for execution within the computing device 1310 or computer system 1300. The controller 1312, as hardware, may include a single-threaded processor, a multi-threaded processor, a multi-core processor and so forth. The controller 1312 may be capable of processing instructions stored in the memory 1314 or the data store 1318.

The memory 1314 may store information within the computing device 1310. The memory 1314 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 1314 may store program instructions, program data, executables, and other software and data useful for controlling operation of the computing device 1310 and configuring the computing device 1310 to perform functions for a user 1330. The memory 1314 may include a number of different stages and types of memory for different aspects of operation of the computing device 1310. For example, a processor may include on-board memory and/or cache for faster access to certain data or instructions, and a separate, main memory or the like may be included to expand memory capacity as desired. All such memory types may be a part of the memory 1314 as contemplated herein.

The memory 1314 may, in general, include a non-volatile computer readable medium containing computer code that, when executed by the computing device 1310 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 1314 is depicted, it will be understood that any number of memories may be usefully incorporated into the computing device 1310.

The network interface 1316 may include any hardware and/or software for connecting the computing device 1310 in a communicating relationship with other resources through the network 1302. This may include remote resources accessible through the Internet, as well as local resources available using short range communications protocols using, e.g., physical connections (e.g., Ethernet), radio frequency communications (e.g., Wi-Fi, Bluetooth), optical communications (e.g., fiber optics, infrared, or the like), ultrasonic communications, or any combination of these or other media that might be used to carry data between the computing device 1310 and other devices. The network interface 1316 may, for example, include a router, a modem, a network card, an infrared transceiver, a radio frequency (RF) transceiver for receiving AM/FM or satellite radio sources, a near field communications interface, a radio-frequency identification (RFID) tag reader, or any other data reading or writing resource or the like.

The network interface 1316 may include any combination of hardware and software suitable for coupling the components of the computing device 1310 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 1302 such as the Internet. This may also include hardware/software for a WiMax connection or a cellular network connection (using, e.g., CDMA, GSM, LTE, or any other suitable protocol or combination of protocols). The network interface 1316 may be included as part of the input/output devices 1320 or vice-versa.

The data store 1318 may be any internal or external memory store providing a computer-readable medium such as a disk drive, an optical drive, a magnetic drive, a flash drive, or other device capable of providing mass storage for the computing device 1310. The data store 1318 may store computer readable instructions, data structures, program modules, and other data for the computing device 1310 or computer system 1300 in a non-volatile form for relatively long-term, persistent storage and subsequent retrieval and use. For example, the data store 1318 may store an operating system, application programs, program data, databases, files, and other program modules or other software objects and the like. At least a portion of the data store 1318 may be implemented in a distributed ledger technology such as a blockchain to record transaction information and smart contracts.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

The input/output interface 1320 may support input from and output to other devices that might couple to the computing device 1310. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also include an infrared interface, RF interface, magnetic card reader, or other input/output system for wirelessly coupling in a communicating relationship with other local devices. It will be understood that, while the network interface 1316 for network communications is described separately from the input/output interface 1320 for local device communications, these two interfaces may be the same, or may share functionality, such as where a USB port 1370 is used to attach to a Wi-Fi accessory, or where an Ethernet connection is used to couple to a local network attached storage. The input/output interface 1320 may further output signals to displays of peripheral devices, as described herein.

As used herein, a user 1330 is any human that interacts with the computer system 1300. In this context, a user may be generally classed within one of two categories. One category is an administrator of the system, representing the seller and/or financial institution (issuer) organizing and conducting the offering of the intellectual property security. Another category is an investor who buys and sells shares in the intellectual property security.

In certain embodiments the I/O interface 1320 facilitates communication with input and output devices for interacting with a user. For example, the I/O interface may communicate with one or more devices such as a user-input device and/or a display 1350 which may be instantiated on the device described herein or on a separate device such as a mobile device 1208, which enable a user to interact directly with the controller 1312 via bus 1332. The user-input device may comprise one or more push-buttons, a touch screen, or other devices that allows a user to input information. In these embodiments, the computer system may further comprise a display to provide visual output to the user. The display may comprise any of a variety of visual displays, such as a viewable screen, a set of viewable symbols or numbers, and so on. One can appreciate that the inputs and outputs of the computer system would be different for administrators and investors. Accordingly, the computing device 1310 may communicate administrators and investors with different interfaces 1324 and 1328.

A peripheral 1322 may include any device used to provide information to or receive information from the computing device 1310. This may include human input/output (I/O) devices such as a keyboard, a mouse, a mouse pad, a track ball, a joystick, a microphone, a foot pedal, a camera, a touch screen, a scanner, or other device that might be employed by the user 1330 to provide input to the computing device 1310. This may also or instead include a display, a printer, a projector, a headset or any other audiovisual device for presenting information to a user. The peripheral 1322 may also or instead include a digital signal processing device, an actuator, or other device to support control of or communication with other devices or components. In one aspect, the peripheral 1322 may serve as the network interface 1316, such as with a USB device configured to provide communications via short range (e.g., Bluetooth, Wi-Fi, Infrared, RF, or the like) or long range (e.g., cellular data or WiMax) communications protocols. In another aspect, the peripheral 1322 may augment operation of the computing device 1310 with additional functions or features, or other device. In another aspect, the peripheral 1322 may include a storage device such as a flash card, USB drive, or other solid-state device, or an optical drive, a magnetic drive, a disk drive, or other device or combination of devices suitable for bulk storage. More generally, any device or combination of devices suitable for use with the computing device 1310 may be used as a peripheral 1322 as contemplated herein.

Other hardware 1326 may be incorporated into the computing device 1310 such as a co-processor, a digital signal processing system, a math co-processor, a graphics engine, a video driver, a camera, a microphone, additional speakers, and so forth. The other hardware 1326 may also or instead include expanded input/output ports, extra memory, additional drives, and so forth.

A bus 1332 or combination of busses may serve as an electromechanical backbone for interconnecting components of the computing device 1310 such as the controller 1312, memory 1314, network interface 1316, other hardware 1326, data store 1318, and input/output interface. As shown in the figure, each of the components of the computing device 1310 may be interconnected using a system bus 1332 in a communicating relationship for sharing controls, commands, data, power, and so forth.

The computing device 1310 is connected to a power source 1360 to provide electrical power for the computing device to run.

The various illustrative logical blocks, modules and circuits described in connection with the present disclosure may be implemented or performed with one or more processors specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein. In the distributed networked system described herein, a plurality of processors on a plurality of devices provide a plurality of nodes for the network.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of computer applications for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

The computer program controls input and operation of the device. The computer program includes at least one code segment stored in or on a computer-readable medium residing on or accessible by the device for instructing the computing elements, and any other related components to operate in the manner described herein. The computer program is preferably stored within the memory and comprises an ordered listing of executable instructions for implementing logical functions in the device. However, the computer program may comprise programs and methods for implementing functions in the device that are not an ordered listing, such as hard-wired electronic components, programmable logic such as field-programmable gate arrays (FP- GAs), application specific integrated circuits, or other similar or conventional methods for controlling the operation of electrical or other computing devices.

Similarly, the computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. The computer-readable medium may even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 4:
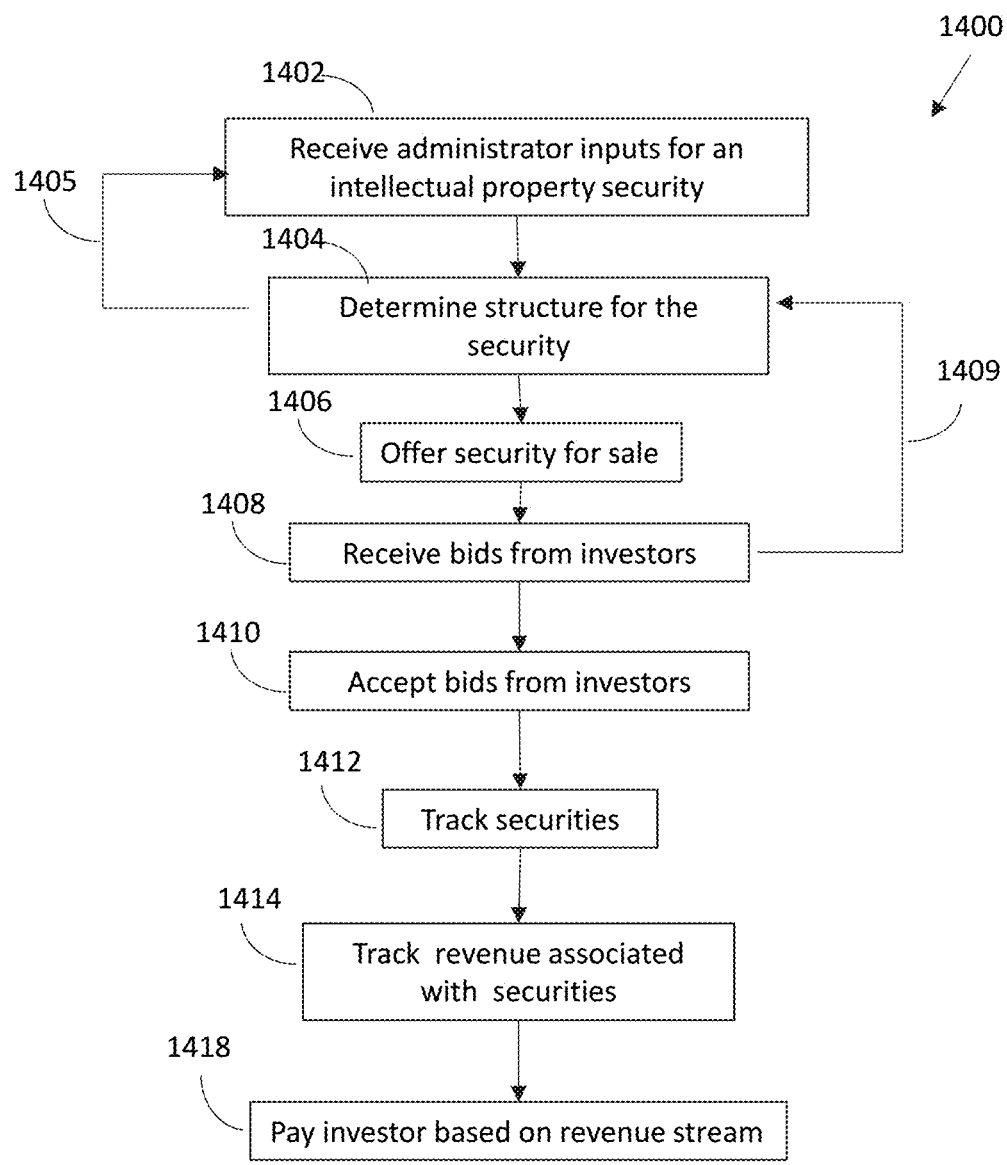
FIG. 4 shows a process flow diagram for defining, offering for sale and administering an intellectual property security according to an embodiment of the disclosed subject matter.

FIG. 4 shows a process flow diagram 1400 for defining and offering for sale intellectual property security according to an embodiment of the disclosed subject matter.

The process flow diagram 400 starts at block 1402 wherein the computer system receives inputs from administrator(s) representing the seller regarding an intellectual property asset to be offered as described herein. Inputs include a target amount of capital to be raised, information regarding the intellectual property's current and potential valuation, etc. The intellectual property may be rights to a royalty or revenue stream of a movie or pool of movies.

The computer system determines a structure for the intellectual property security in block 1404. The determination of the structure comprises conducting activities in blocks 1221, 1222 and 1223 of FIG. 2B. It is to be appreciated that defining the structure of the offering in block 1404 may comprise several iterative interactions between the computer system and administrator(s) or seller(s) to define the final structure of the intellectual property security (arrow 1405). It can be appreciated that some activities related to determining a structure for an intellectual property-backed security may be considered confidential, so these activities may be conducted in portions of the computer system that are not distributed or accessible to parties (for example, potential investors) that are not authorized to participate in defining the offering.

Once the final structure of the offering is determined, the computer system moves to executing the offering (block 1251 of FIG. 2B) by moving to block 1406. Block 1406 comprises offering the intellectual property security for sale to potential investors. In the distributed networked computer system described herein, block 1406 may comprise recording an entry in a distributed ledger that defines the offering. In embodiments using a blockchain as a distributed ledger, this entails inserting a block defining the offering in a blockchain. Block 1408 comprises receiving bids for shares from investors. Receiving bids may comprise recording the bid information in the distributed ledger, such as by adding a block in the blockchain. As discussed above, in some embodiments, a buyer may bid on shares of intellectual property assets already offered for sale by the seller, or may enquire about assets not currently offered for sale. In embodiments wherein an investor initiates an enquiry about intellectual property asset(s), the inquiry is directed by the system from the investor into block 1402 of the process flow scheme (arrow 1409) for analysis and response from the seller(s). It is to be appreciated that defining the structure of buyer-initiated intellectual properties in block 1404 may comprise several iterative interactions among the computer system, investors and administrator(s) or seller(s) (arrows 1405 and 1409) to define the final structure of the intellectual property security. Buyer-initiated enquiries and responses from sellers are recorded in the distributed ledger or blockchain as discussed above.

Block 1410 comprises accepting the bids from investors. Accepting the bids includes receiving payments from the investors and issuing shares to the investors at their bid price(s) and holding them in the computer system in the distributed ledger or blockchain. Accepting the bids may also include the system designing investor-initiated queries and submitting them for acceptance by the seller. As described above, acceptance of the bids by sellers may comprise generation of a smart contract that defines the final terms and conditions of the intellectual property security, including payouts and triggering events.

It can be appreciated that once a first investor purchases an intellectual property-backed security, the first inventor may choose to attempt to sell the IPBS he holds to a second investor. In that instance, the first investor may interact with the computer system as a seller and offer his share(s) for sale at block 1406. A second investor can purchase such share(s) using steps 1408 and 1410. Thus, the process 1400 enables a distributed networked computer system described herein to serve as a marketplace for issuing, trading and administering intellectual property-backed securities.

The system tracks the sales of intellectual property securities in block 1412, including the total number of securities sold, the prices offered in bids and accepted by the computer system and the holders of the securities using a distributed ledger such as a blockchain. The computer system also tracks revenues associated with the intellectual property assets and determines whether targets defined in the intellectual property security have been met in block 1414. Targets may include revenue from licensing fees, royalties, distribution, placement fees, sales of movie-associated merchandise, etc. In embodiments, a payout triggering event may comprise a first threshold that occurs when monetization of the intellectual property asset exceeds total expenses associated with producing the intellectual property asset. Other triggering events may occur when monetization exceeds a specified percentage over the total expenses, or when revenues exceed a specified amount. Notably, each triggering event can determine a different payout regime.

If the computer system determines that the target(s) are reached in block 1414, the computer system moves to block 1418 and disperses payments to investors based on the terms of the securities defined in the smart contract.

The system and methods described herein may be used for private offerings, initial public offerings or combinations thereof. For example, intellectual property securities may be offered to a limited number of private venture capital entities. It is to be appreciated that the terms and conditions of the intellectual property-backed security are defined in a smart contract, so different smart contracts can be negotiated by different investors. For example, in a private offering each private venture capital entity may be able to negotiate terms and conditions separately from other private venture capital entities. In other examples, investors such as preferred investors, angel investors, accredited investors or venture capital investors willing and able to invest larger sums may obtain better terms than smaller investors. For example, such investors may be able to negotiate with the seller to define terms and conditions for a smart contract, while smaller investors may be limited to purchasing a security where the terms and conditions for a payout are non-negotiable. Larger investors may receive payouts starting at a first threshold that occurs when monetization of the intellectual property asset exceeds total expenses associated with producing the intellectual property asset, while smaller investors may not receive payouts after the first threshold and have to wait for a payout at a different, higher threshold. In other words, only some of the smart contracts are executed to distribute a payout when the first threshold triggering event is met.

Figure 5:
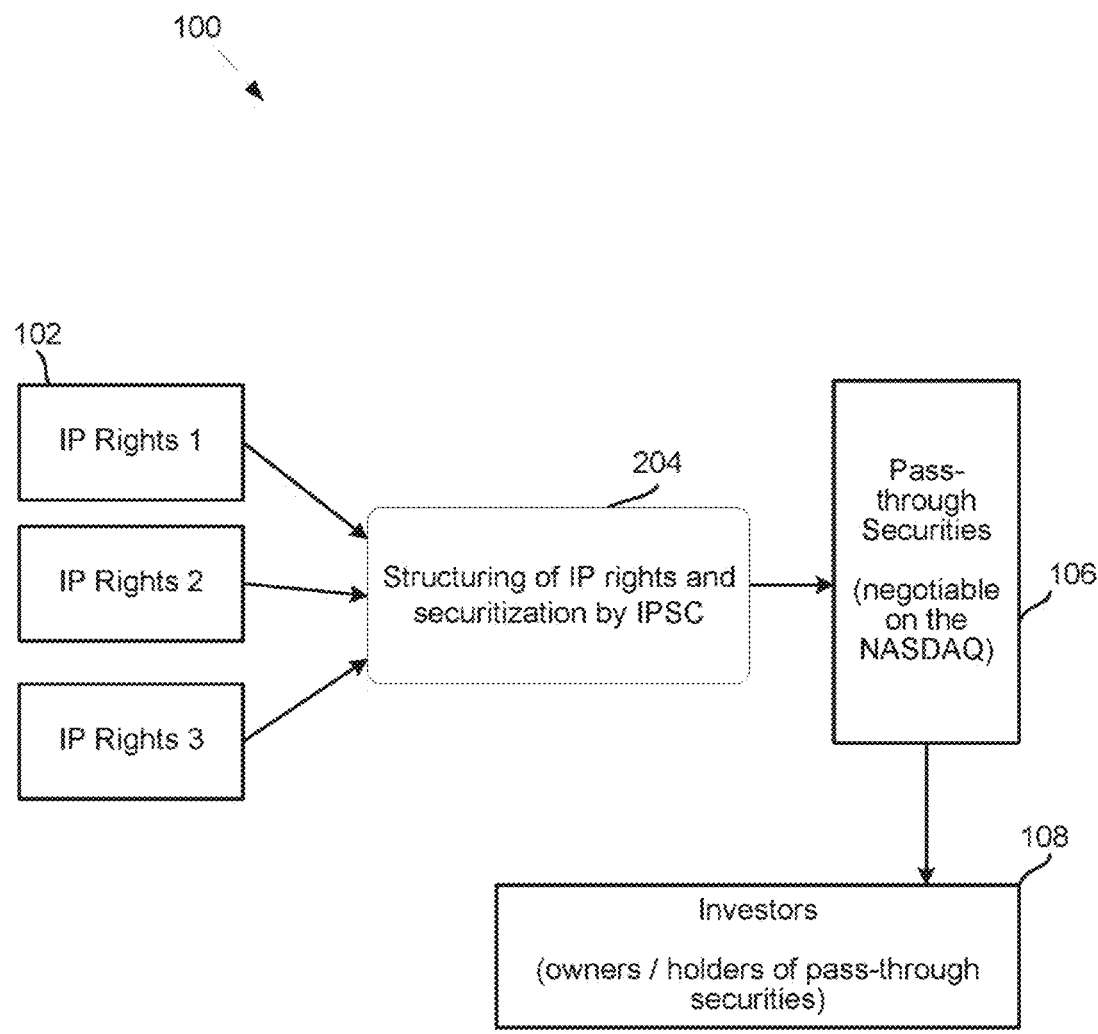
FIG. 5 is an example of an embodiment of an intellectual property pass-through security in accordance with disclosed subject matter.

Now, referring to FIG. 5 is an example of another embodiment of a pass-through system 100 for securitization of intellectual property rights comprising, for the sake of illustration IP rights 102 (here 1, 2, and 3) in a single project. These rights are consolidated in the structuring of the IP rights securitization 104 to create a pass-through security 106 negotiable on a stock exchange such as the NASDAQ. Investors 108 become the holders of the pass-through security 108.

In certain embodiments the pass-through system 100 is configured for direct ownership by multiple investors. Use of the pass-through system 100 may establish a marketplace for intellectual property securities and provide for brokerage on the public of private market and thus facilitate the raising of capital by owners of intellectual property.

Candidates for this service include without limitation innovators and inventors in all fields, major production companies, publishing houses, record companies and auction houses. Currently the provision of financing is often accompanied by a restriction on the content and execution of the work. Therefore, the system and method provided herein may facilitate wider freedom in the production of technology, culture, science and the arts by enabling the value of an intellectual property to be converted into a form of greater liquidity that enables faster, more transparent investment.

In certain embodiments owners of an intellectual property right can obtain funding for a work in various stages of completion. Some embodiments provide a means for investors to invest in a specific intellectual property securitization, as opposed to a pooled group of securities. In various embodiments the created security is based on an Intellectual Property right and not primarily on debt or equity.

Figure 6:
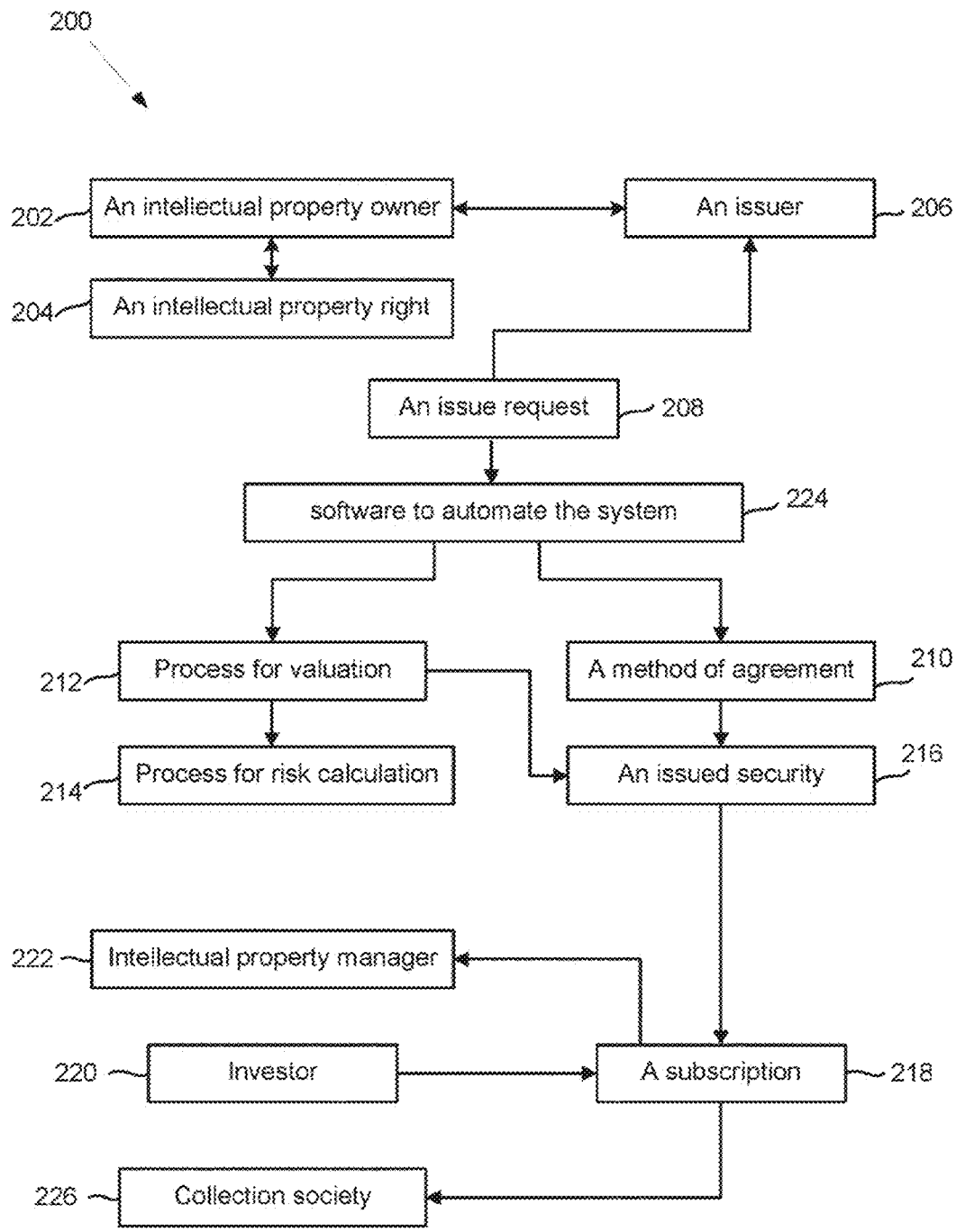
FIG. 6 is a schematic line drawing illustrating an embodiment of a system for converting intellectual property to a marketable security in accordance with disclosed subject matter.

FIG. 6 is a schematic line drawing illustrating an embodiment of the system 200 presented herein to enable an intellectual property owner 202 to create a subscription 218 for the right to invest, the system 200 comprising an intellectual property owner 202, an intellectual property right 204, an issuer 206, an issue request 208, a method of agreement 210, a process for valuation 212, a process for risk calculation 214, an issued security 216, a subscription 218, an investor 220, an intellectual property manager 222, and a collection society 224.

In some embodiments the intellectual property owner 202 and the issuer 206 are the same entity. However, in many instances, the intellectual property owner 202 may not have sufficient expertise and/or resources to value, underwrite, issue and administer securities. In such instances, the owner 202 may engage with an Intellectual Property Security Company ("IPSC"), which converts IP rights into securities. However, because it is a pass-through security, the investors acquire the property of the securities rather than a claim on the proceeds of the securities or ownership rights in the IP. IPSC pools the IP rights and securitizes them but does not operate as a special purpose vehicle and does not issue asset-backed bonds. Rather, investors directly hold the securities issued by IPSC. In some embodiments IPSC does not pool IP rights arising or in connection with various projects in one issuance, but rather an IP right arising or in connection with a single project in one issuance.

The method of agreement 210 may be initialized with a request for issuance of the security made by the owner 202 of the intellectual property right 204. The system 200 sometimes includes a process for valuation 212. In certain embodiments the status, quality and profitability of the intellectual property right 204 are analyzed according to market value. A process for risk calculation 214 may be included in the process for valuation 212. The issued security 216 becomes the basis for the subscription 218, which is then available to the investor 220. The intellectual property owner 202 and/or the issuer 204 may engage an intellectual property manager 222 and a collection society 224 may collect and disperse subscription fees.

Figure 7:
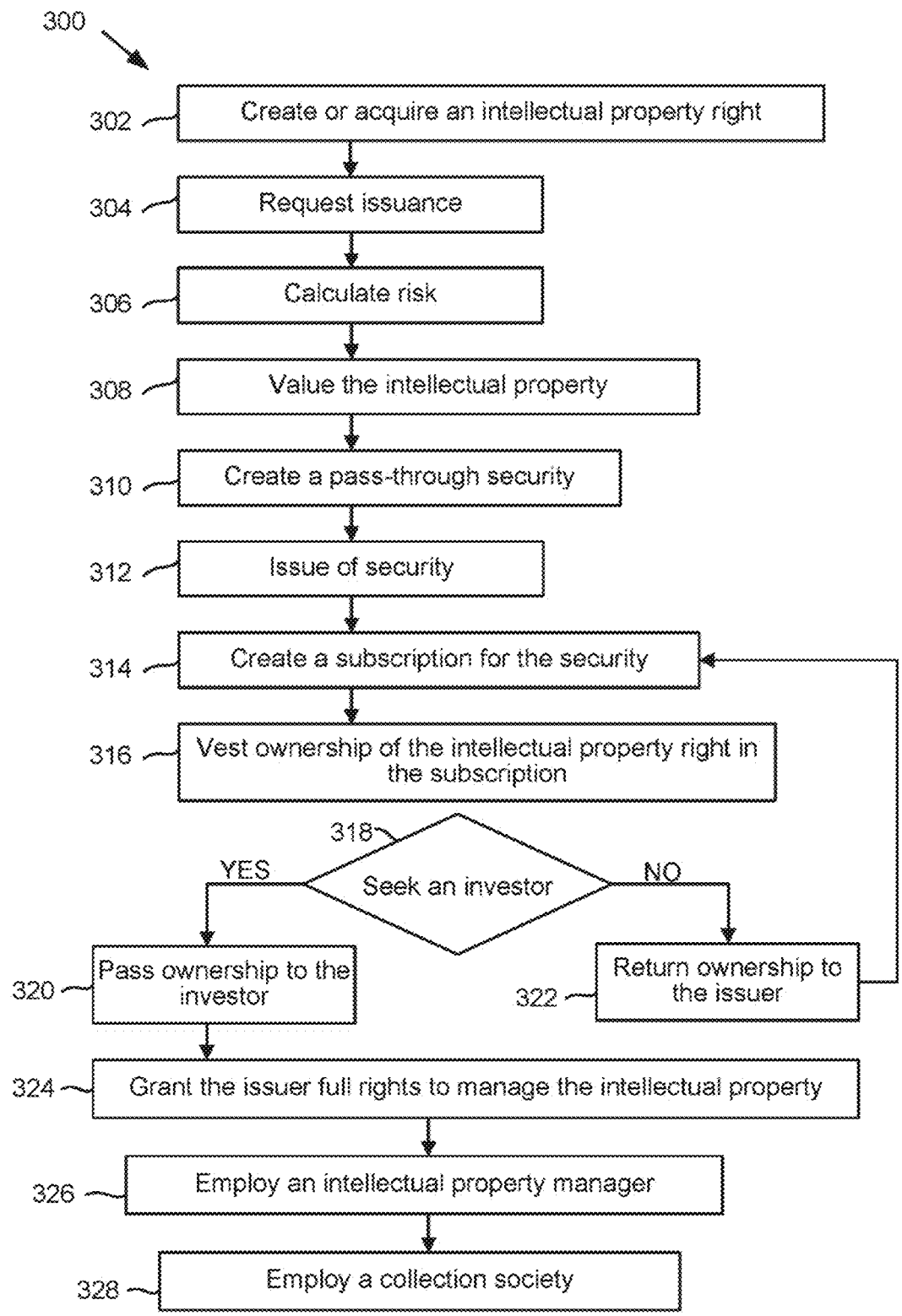
FIG. 7 is a schematic flow chart illustrating an embodiment of a method for converting intellectual property to a marketable security in accordance with disclosed subject matter.

FIG. 7 is a schematic flow chart diagram illustrating an embodiment of a method 300 for conversion of an intellectual property right to a marketable security. The method 300 comprises the steps: creation or acquisition of an intellectual property right 302, request for issuance 304, calculation of risk 306, valuation 308, creation of a pass-through security 310, issuance of a security 312, creation of a subscription for the security 314, vesting of ownership of the intellectual property right in the subscription 316, query 318 for investors, if NO return of ownership to the original owner 320, if YES passing ownership to the investor 322, granting full rights of intellectual property management to the issuer 324.

In some embodiments use of a pass-through security allows ownership to be held directly by the investor 220. In such cases a trustee body is not the holder of the security right. The issuer 206 may retain right to management of intellectual property, or may be granted a license, while a collection society 224 may be used to collect the revenue. Software may be used to automate the method at any or all stages.

In certain embodiments of the present method the issuance of the security 216 takes place when there is not yet party to the agreement, in which case ownership of the intellectual property right 204 is vested in the subscription 218. Should the project fail to attract an investor 220, the right will return to the initial owner 202. In some embodiments the security product is not pooled together with other similar security products, but the intellectual property is offered on a particular basis, so the investment is in a specific item, which is clearly identifiable.

Figure 8A:
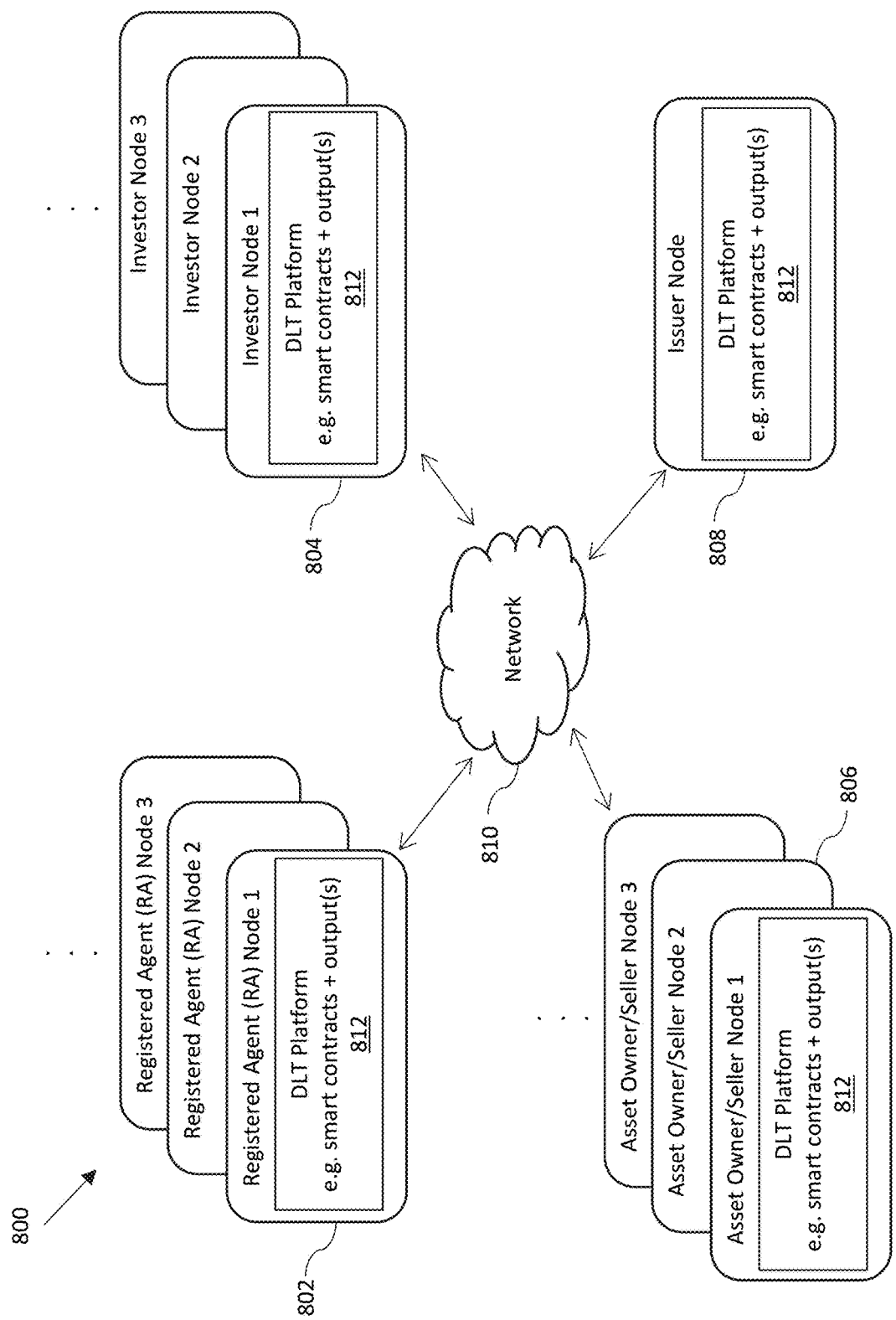
FIGS. 8A and 8B are schematic diagrams illustrating example embodiments of a system comprising nodes and users that may be involved in a distributed networked system utilizing one or more smart contracts on a distributed ledger technology platform offering for sale and administering an intellectual property security in accordance with disclosed subject matter.
Figure 8B:
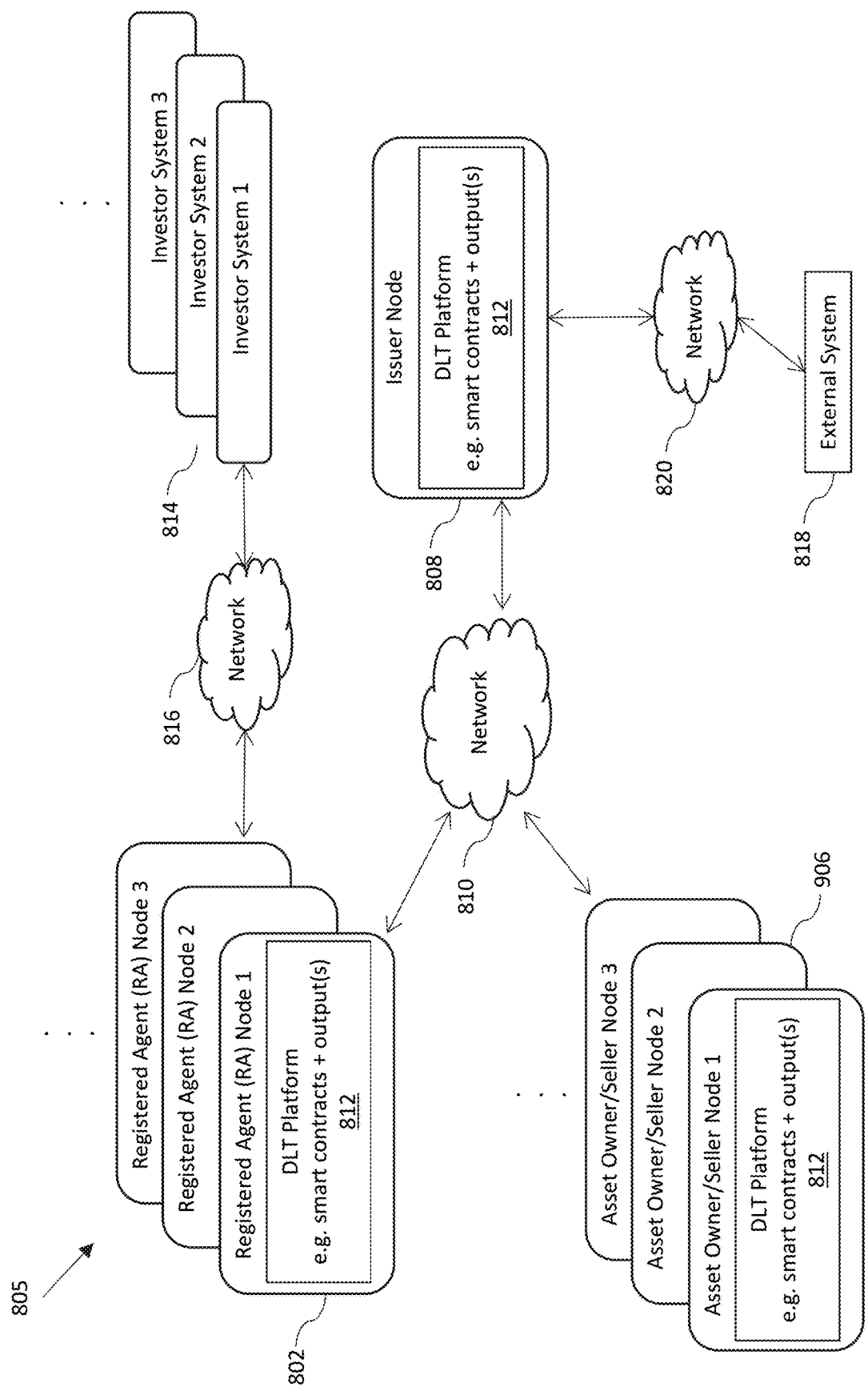

FIGS. 8A and 8B are schematic diagrams illustrating example embodiments of a system comprising nodes and users that may be involved in a smart system for securitizing intellectual property utilizing one or more smart contracts on a distributed ledger technology platform. A node is a connection point in a communications network and allow users to interact with the network. Each node is an endpoint for data transmissions or redistribution. Nodes have either a programmed or engineered capability to recognize, process and forward transmissions to other network nodes As illustrated in FIG. 8A, in some embodiments, a smart intellectual property-backed security (IPBS) platform 800 can comprise one or more registered agent (RA) or dealer nodes 802, one or more investor nodes 804, one or more asset owner (seller) nodes 806, and/or a central authority node 808, which can be in communication with one another through a network 810. The central authority node 808 is held by the issuer of the IPBS, such as an Intellectual Property Security Company. In some embodiments, one or more of the RA node(s) 802, investor node(s) 804, asset owner node(s) 806, and central authority node 808, such as node controlled by the issuer IPSC, can comprise a DLT platform 812 on which the smart IPBS platform, one or more smart contracts and smart contract outputs thereof, and/or one or more private data sharing channels may be implemented. In some embodiments, the DLT platform 812 can be configured to facilitate the filing, tracking, management, communications, notifications, or the like of the smart platform as described herein. In some embodiments, the system 800 may also include an external system 818 as described below with regard to FIG. 8B.

As illustrated in FIG. 8B, in some embodiments of a smart intellectual property-backed security (IPBS) platform 805, one or more investor systems 814 may not comprise a DLT platform. Rather, the one or more investor systems 814 can be configured to communicate with one or more RA nodes 802 comprising a DLT platform 812 through a separate network 816, for example through an application programming interface ("API"). As such, in some embodiments, one or more investor systems 814 may not be on the DLT itself. For example, small investors may be able to purchase securities from a registered agent or dealer in the distributed network, who is authorized to negotiate terms and conditions of the smart contracts on behalf of small investors. The RA may negotiate the terms and conditions prior to or after engaging with investors not on the DLT itself. Further, in some embodiments, a central authority node 808 can be configured to maintain a separate external system 818. In some embodiments, the separate external system 818 can be in communication with the central authority node 808 through a separate network connection 820, such as an API, for example for purposes of maintaining legally valid versions of the IPBS filings. In some embodiments, the smart filings on the DLT itself can be the legally valid and canonical version of the filings. In embodiments, the external system may also include modules for managing the securitization that are desirably kept separate from the distributed ledger. For example, owner confidential information and pre-issuance activities such as valuation of and administering securities (e.g. blocks 1220 and 1250 of FIGS. 2A and 2B and blocks 1402 and 1404 of FIG. 4) may be held in the separate external system. In other embodiments, the smart intellectual property-backed security (IPBS) platform may comprise a combination of investors 804 with nodes on the distributed ledger and investors 814 without nodes on the distributed ledger.

In various embodiments the specific system of securitization enables trades to take place on the NASDAQ or other exchange. Therefore, a holder may exit at the stage of brokerage through a public or private offering. The system and method presented herein provide a vehicle for individuals to invest and for an individual issuer or a collective issuer to raise capital originating from multiple investors. For example: A director decides to use securitization to raise funds for a future movie, which has not yet been filmed. After a request is made: (1) the valuation process estimates, based upon the monetary success of his previous films and the size of the audience, that it will have a market value of 200 million. (2) The cost to film, produce and distribute the movie is a fraction of this value, thus the project is viable. (3) The director owns the intellectual property, whilst having a profit share agreement, with a distribution company. (4) After issuance of the security, the intellectual property right is securitized. (5) A Platform is set up, whereby investors can invest in this movie, thus gaining direct ownership in the intellectual property. (6) Marketing of the opportunity allows a fan base to invest in this movie. (7) The intellectual property is not pooled with similar products but is offered on an individual basis. The investor is investing in a movie, not a pooled group of movies (8) A license is granted to the director, giving him the right to manage the intellectual property.

In other embodiments, an existing intellectual property with a projected revenue stream can back the security to enable the holder of the intellectual property to raise enough capital to fund a future intellectual property asset. For example, a movie with a successful opening may be used to back a security to raise capital for a sequel immediately, based on the projected revenue from the first movie.

Additional aspects of the disclosed subject matter include the following.

An intellectual property-backed security comprising investment shares based on one or a plurality of intellectual property assets providing a defined payout to investors based on a revenue stream associated with the intellectual property asset or assets.

A method for providing an intellectual property security, the method comprising defining an offering for sale of investment shares composed of one or a plurality of intellectual property assets; receiving bids from investors for purchase of the investment shares; accepting the bids from investors; tracking revenue associated with the intellectual property assets; and paying the investors a portion of the revenue as it is received.

A system comprising a computerized system with hardware and specialized software components for developing, executing and administering intellectual property securities, the system comprising a non-transitory computer readable storage medium comprising a plurality of computer readable instructions embodied thereon which, when executed by the computerized system, causes the computerized system to define an offering for sale of investment shares composed of one or a plurality of intellectual property assets; receive bids from investors for purchase of the investment shares; accept the bids from investors; track revenue associated with the intellectual property assets; and pay the investors a portion of the revenue as it is received.

A non-transitory computer readable storage medium comprising a plurality of computer readable instructions embodied thereon wherein the instructions, when executed by a computerized system with hardware and specialized software components for developing, executing and administering intellectual property securities, cause the computerized system to define an offering for sale of investment shares composed of one or a plurality of intellectual property assets; receive bids from investors for purchase of the investment shares; accept the bids from investors; track revenue associated with the intellectual property assets; and pay the investors a portion of the revenue as it is received.

A computer system for execution of transactions involving securitizing an intellectual property-based asset associated with an entity, the computer system comprising a central processor operatively coupled to a main memory; the main memory comprising a plurality of databases, wherein a first database stores a first set of information describing each of a plurality of intellectual property-based assets associated with one or more entities, the first database further storing a plurality of available tokens, each token representing an allocated value associated with the intellectual property-based asset associated with the one or more entities; and an order book database that stores orders and quotes for a particular intellectual property based security associated with the one or more entities; wherein each token has a value based on the value of the particular intellectual property security it is associated with; executable code that causes the central processor device to match an order input remotely by a first user with one or more tokens such that the segment of the database storing the requested one or more tokens is restricted from matching an order input from a second user for the same one or more tokens requested by the first user; and an order management executable code that sends a message to report the purchase of the one or more tokens to the first user. The computer system may be a distributed computer system.

In embodiments, the value of the intellectual property asset represents a portion of the total value of the intellectual property-based asset at any given period of time. The purchased tokens may be transmitted to a wallet designated by the first user. The system may be in communication with a second escrow computer system, wherein the second computer system collects payment from the first user for the purchase of one or more tokens. The purchase of the one or more tokens entitles the first user to royalty payments from the entity and transmits the funds to the purchaser.

The computer system may further comprise an accessible storage device that provides a persistent store of recorded information relating to the plurality of intellectual property assets associated with one or more entities. The computer system may further comprise a second database storing a second set of information describing a plurality of investors, each investor being a purchaser of one or more tokens representing an equity interest in the intellectual property asset; and a third database storing royalty information for each investor based on the tokens owned by each investor.

A method of electronic trading of equities in a segment of a company comprising defining an offering for sale of the equities, wherein the equities comprise a plurality of available tokens, each token representing an allocated value associated with an intellectual property-based asset associated with one or more entities within the segment of the company; receiving an order input remotely by a first user in an order book database, wherein the order book database stores orders and quotes for a particular intellectual property based security associated with the one or more entities; matching the order input remotely by the first user with one or more tokens such that the segment of the database storing the requested one or more tokens is restricted from matching an order input from a second user for the same one or more tokens requested by the first user; accepting the order from the first user; and sending a message to report the purchase of the one or more tokens to the first user.

In embodiments of the method, the value of the intellectual property asset represents a portion of the total value of the intellectual property-based asset at any given period of time. The purchased tokens may be transmitted to a wallet designated by the first user. The order book database may be in communication with a second escrow computer system, wherein the second computer system collects payment from the first user for the purchase of one or more tokens.

The purchase of the one or more tokens entitles the first user to royalty payments from the entity and wherein the order book database is in communication with a third database storing royalty information for each investor based on the tokens owned by each investor, the method further comprising transmitting royalty payments associated with the purchased one or more tokens to the first user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A distributed network computer system for smart contract execution of transactions for securitized intellectual property assets, the distributed network computer system comprising:
   a distributed ledger associated with a plurality of users of the system;
   a securities planning module, an administrative module, and financial transactions module, each implemented as a distinct component configured to interact with the distributed ledger;
   one or more processors; and
   one or more memories operatively coupled to at least one of the one or more processors and having instructions stored thereon that, when executed by at least one of the one or more processors, cause:
   the securities planning module to determine a structure of an intellectual property-backed security ("IPBS") offering, wherein the confidential structuring of the IPBS offering involves modeling and evaluating variables, and further wherein the intellectual property is selected from the group consisting of a motion picture, work of authorship, songs, or a combination thereof,
   the administration module to transmit the IPBS offering to one or more networked nodes of a plurality of nodes associated with the plurality of users and to receive one or more bids for one or more shares of the IPBS offering from one or more investors among the plurality of users;
   and
   the financial transactions module to process payments for the shares of IPBS to execute a transaction and transmit transaction-related information to the distributed ledger;
   wherein the transaction-related information comprises compiled code corresponding to a smart contract, each smart contract comprising immutable self-executing code configured to automatically detect and respond to specific, predefined revenue stream payout events, and wherein execution of the smart contracts is immutably recorded on the distributed ledger, providing an auditable and tamper-resistant record.

2. The distributed network computer system of claim 1, wherein the payout triggering event is based on revenue associated with monetization of one of the one or more intellectual property assets.

3. The distributed network computer system of claim 2, wherein the payout triggering event comprises a first threshold that occurs when monetization of one of the one or more intellectual property assets exceeds total expenses associated with producing the one of the one or more intellectual property assets.

4. The distributed network computer system of claim 3, wherein only some of the smart contracts are executed to distribute a payout when the first threshold is met.

5. The distributed network computer system of claim 2, wherein the one of the one or more intellectual property assets is a movie production, and further wherein the monetization comprises distribution of the movie.

6. The distributed network computer system of claim 2, wherein the monetization comprises sale of production rights or publishing rights to the work of authorship.

7. The distributed network computer system of claim 1, wherein the payout is a portion of a royalty associated with one of the one or more intellectual property assets.

8. At least one non-transitory computer-readable medium storing computer-readable instructions for smart contract execution of transactions for securitized intellectual property assets that, when executed by one or more computing devices of a distributed network computer system, cause:
- a securities planning module to determine a structure of an intellectual property-backed security ("IPBS") offering, wherein the intellectual property is selected from the group consisting of a motion picture, work of authorship, song, or a combination thereof, and the activities to define the structure of the IPBS offering are confidentially protected within the system so as not to be accessible to certain individuals, transmit the structure of the IPBS offering to an administration module;
- the administration module to transmit the IPBS offering to one or more networked nodes of a plurality of nodes associated with a plurality of users associated with a distributed ledger, the administration module configured to receive one or more bids for one or more shares of the IPBS offering from one or more investors among the plurality of users;
- and
- transmit instructions to a financial transactions module to process payments for one or more shares of IPBS to execute a transaction;
- transmit transaction-related information to the distributed ledger wherein the transaction-related information comprises immutable self-executing code defining a smart contract to:
  - generate sets of terms and conditions based on the structure of the IPBS offering and the shares of the IPBS allocated to each respective investor;
  - detect a revenue stream payout triggering event relating to the generated sets of terms and conditions associated with each respective investor;
  - automatically in response to the triggering event, transmitting instructions to the financial transactions module to effect a payout to the one or more investors based on the terms and conditions of the smart contract, wherein the securities planning module, administration module and financial transactions module are each implemented as a distinct component, each configured to interact with the distributed ledger and the IPBS offering involves modeling and evaluating variables to provide a confidential structuring.

9. The at least one non-transitory computer-readable medium of claim 8, wherein the payout triggering event is based on revenue associated with monetization of one of the one or more intellectual property assets.

10. The at least one non-transitory computer-readable medium of claim 9, wherein the payout triggering event comprises a first threshold that occurs when monetization of one of the one or more intellectual property assets exceeds total expenses associated with producing the one of the one or more intellectual property assets.

11. The at least one non-transitory computer-readable medium of claim 10, wherein only some of the smart contracts are executed to distribute a payout when the first threshold is met.

12. The at least one non-transitory computer-readable medium of claim 9, wherein the one of the one or more intellectual property assets is a movie production, and further wherein the monetization comprises distribution of the movie.

13. The at least one non-transitory computer-readable medium of claim 9, wherein the one of the one or more intellectual property assets is a work of authorship, and further wherein the monetization comprises sale of production rights or publishing rights to the work of authorship.

14. The at least one non-transitory computer-readable medium of claim 8, wherein the payout is a portion of a royalty associated with one of the one or more intellectual property assets.

15. A method executed by one or more computing devices for smart contract execution of transactions for securitized intellectual property assets on a distributed network computer system, the method comprising:
- defining, by a securities planning module implemented as a distinct component, a structure of an intellectual property-backed security ("IPBS") offering, wherein the confidential structuring of the IPBS offering involves modeling and evaluating variables;
- transmitting the defined structure of the IPBS offering to an administration module implemented as a distinct component configured to interact with the distributed ledger, wherein
- the administration module transmit ting the IPBS offering to one or more networked nodes of a plurality of nodes associated with a plurality of users of a distributed ledger and
- receiving one or more bids for one or more shares of the IPBS offering from one or more investors among the plurality of users;
- transmitting instructions to a financial transactions module implemented as a distinct component configured to interact with the distributed ledger to process payments from the one or more investors and disburse payments to a seller of the shares of the IPBS to execute a transaction;
- transmitting transaction-related information, the transaction-related information comprising compiled code corresponding to a smart contract, each smart contract comprising immutable self-executing code configured to automatically detect and respond to specific, predefined revenue stream payout events, and wherein execution of the smart contracts is immutably recorded on the distributed ledger, providing an auditable and tamper-resistant record.

16. The method of claim 15, wherein the payout triggering event is based on revenue associated with monetization of one of the one or more intellectual property assets.

17. The method of claim 16, wherein the payout triggering event comprises a first threshold that occurs when monetization of one of the one or more intellectual property assets exceeds total expenses associated with producing the one of the one or more intellectual property assets.

18. The method of claim 17, wherein only some of the smart contracts are executed to distribute a payout when the first threshold is met.

19. The method of claim 16, wherein the one of the one or more intellectual property assets is a movie production, and further wherein the monetization comprises distribution of the movie.

20. The method of claim 16, wherein the one of the one or more intellectual property assets is a work of authorship, and further wherein the monetization comprises sale of production rights or publishing rights to the work of authorship.

21. The method of claim 15, wherein the payout is a portion of a royalty associated with one of the one or more intellectual property assets.

* * * * *